United States Patent [19]

Mack

[11] Patent Number: 5,634,867

[45] Date of Patent: Jun. 3, 1997

[54] MAIN CLUTCH REENGAGEMENT CONTROL FOR A DOUBLE CLUTCH DOWNSHIFT

[75] Inventor: William J. Mack, Clemmons, N.C.

[73] Assignee: Eaton Corporation, Cleveland, Ohio

[21] Appl. No.: 308,884

[22] Filed: Sep. 19, 1994

[51] Int. Cl.$^6$ ............................. B60K 41/28; B60K 41/02
[52] U.S. Cl. ............................. 477/86; 477/80; 477/171; 477/180; 477/71; 477/123
[58] Field of Search ............................. 477/70, 71, 73, 477/74, 77, 78, 79, 86, 123, 124, 166, 170, 171, 180, 80

[56] References Cited

U.S. PATENT DOCUMENTS

| | | | |
|---|---|---|---|
| 4,081,065 | 3/1978 | Smyth et al. | 477/176 |
| 4,361,060 | 11/1982 | Smyth | 477/78 |
| 4,591,038 | 5/1986 | Asagi et al. | 477/78 |
| 4,621,722 | 11/1986 | Page et al. | 477/171 |
| 4,638,898 | 1/1987 | Braun | 477/86 |
| 4,646,891 | 3/1987 | Braun | 477/175 |
| 4,732,248 | 3/1988 | Yoshimura et al. | 477/171 X |
| 4,766,967 | 8/1988 | Slicker et al. | 180/65.8 |
| 4,799,160 | 1/1989 | Arbeille et al. | 477/180 X |
| 4,874,070 | 10/1989 | Nellums et al. | 477/78 X |
| 5,029,678 | 7/1991 | Koshizawa | 477/80 X |
| 5,056,639 | 10/1991 | Petzold et al. | 477/78 X |
| 5,316,116 | 5/1994 | Slicker et al. | 477/181 |
| 5,383,823 | 1/1995 | Ward et al. | 477/86 |

*Primary Examiner*—Khoi Q. Ta
*Attorney, Agent, or Firm*—Howard D. Gordon

[57] ABSTRACT

A control is provided for controlling reengagement of a master clutch (16) in a vehicular automated mechanical transmission system. A nominal reengagement rate (CLU_RATE) is determined as a function of engine lag ($K_1$), throttle position (THL), engine acceleration/deceleration (dES/dt) and/or input shaft acceleration/deceleration (dIS/dr). To provide smoother shifting during braking (BRK=1, THL=0) and/or coasting (THL<30%) downshifts, the clutch is reengaged at a rate slower than the nominal reengagement rate.

42 Claims, 4 Drawing Sheets

MAIN CLUTCH REENGAGEMENT CONTROL FOR A DOUBLE CLUTCH DOWNSHIFT

BACKGROUND OF THE INVENTION

1. Field of the Invention

The present invention relates to a master clutch reengagement control for an automated mechanical transmission system of the type having a clutch actuator operated by the system controller. In particular, the present invention relates to a master clutch control for controlling the rate of reengagement of a vehicular automated mechanical transmission system master clutch upon completion of a downshift.

2. Description of the Prior Art

Change-gear mechanical transmissions (i.e., transmissions shifted by engaging and disengaging selected jaw clutches), both synchronized and nonsynchronized, are well known in the prior art. Examples of such transmissions may be seen by reference to U.S. Pat. Nos. 4,497,396; 3,221,851; 4,754,665 and 4,735,109, the disclosures of which are incorporated herein by reference.

Automatic and partially automatic mechanical transmission systems wherein the operation of mechanical transmissions is at least partially automated, usually by means of sensors providing input signals to a central control unit (usually microprocessor based) which processes the signals in accordance with predetermined logic rules to issue command output signals to actuators, are also well known in the prior art as may be seen by reference to U.S. Pat. Nos. 4,081,065; 4,361,060; 4,648,290 and 4,595,986, the disclosures of which are incorporated herein by reference.

Controls for controlling the rate of engaging the vehicle master clutch, both for start-from-stop and for dynamic shifting, are well known in the prior art. Typically, the controls involved a rapid movement to the "touch point" or point of "incipient engagement," and then a modulated continuing engagement thereafter. Examples of such controls may be seen by reference to U.S. Pat. Nos. 4,081,065; 4,638,898; 4,646,891; 4,766,967; 5,184,301; 5,316,116 and 5,335,174, the disclosures of which are incorporated herein by reference.

Briefly, in automated mechanical transmission systems of the type having non-manually controlled clutch actuators, a downshift is accomplished by the "double clutching" technique comprising disengaging the master clutch, shifting to neutral, engaging the master clutch and accelerating the engine and transmission input shaft to synchronous for the current output shaft speed and target gear ratio (ES=IS=OS * $GR_T$), disengaging the master clutch, engaging the target gear ratio, and then reengaging the master clutch.

The prior art clutch controls were not totally satisfactory, as downshifting during rapid deceleration (i.e., during braking) and/or coasting conditions (i.e., light throttle conditions) was not as consistently smooth as desired. By way of example, during a braking operation, the vehicle speed (i.e., output shaft speed (OS)) will change rapidly and the engine speed (ES) will often go to a higher-than-desired value due to lag time and the fact that typical diesel engines, as used in heavy-duty trucks, will respond quicker to increasing fuel than to decreasing fuel. The clutch actuator is normally relatively quickly responsive to disengage the master clutch, allowing the input shaft (IS) to coast to synchronous for completion of the shift, whereupon the input shaft speed (IS=OS * GR) will continue to decelerate. Upon reengagement of the master clutch, the slip (i.e., ES−IS) will be reduced to zero. The greater the slip upon reengagement of the master clutch, the harsher the clutch reengagement.

SUMMARY OF THE INVENTION

In accordance with the present invention, the drawbacks of the prior art are minimized or overcome by the provision of a master clutch reengagement control which senses braking and/or coasting downshift conditions and, in response thereto, modifies the rate of master clutch reengagement after engagement of the target gear ratio to provide smoother, less harsh shifts.

The foregoing is accomplished, in an automated mechanical transmission system having a non-manually controlled clutch actuator, by determining a nominal clutch reengagement rate (CLU_RATE) as a function of current vehicle operating conditions such as known lag time, throttle position (THL), engine deceleration (dES/dt) and/or input shaft deceleration (dIS/dt). Application and non-application of the vehicle brakes (BRK=1 or BRK=0) are also monitored. During a downshift, if (i) the vehicle brakes are applied and throttle is essentially zero (BRK=1 and THL=0) and/or (ii) throttle is less than about 30% (THL<30%), then reengagement of the master clutch after engaging the target gear ratio is commanded in the sequence of rapid clutch movement to the touch point and then completion at a rate considerably slower than the nominal clutch reengagement rate (about 20% to 50% of CLU_RATE). Under other conditions, upon reaching the touch point, the clutch is then reengaged at the nominal reengagement rate (CLU_RATE).

Accordingly, it is an object of the present invention to provide a master clutch control for a vehicular automated mechanical transmission system including a controller-operated clutch actuator which will provide smoother shifting in braking and/or coasting downshift conditions.

This and other objects and advantages of the present invention will become apparent from a reading of the detailed description of the preferred embodiment taken in connection with the attached drawings.

DESCRIPTION OF THE PREFERRED EMBODIMENT

Figure 1:
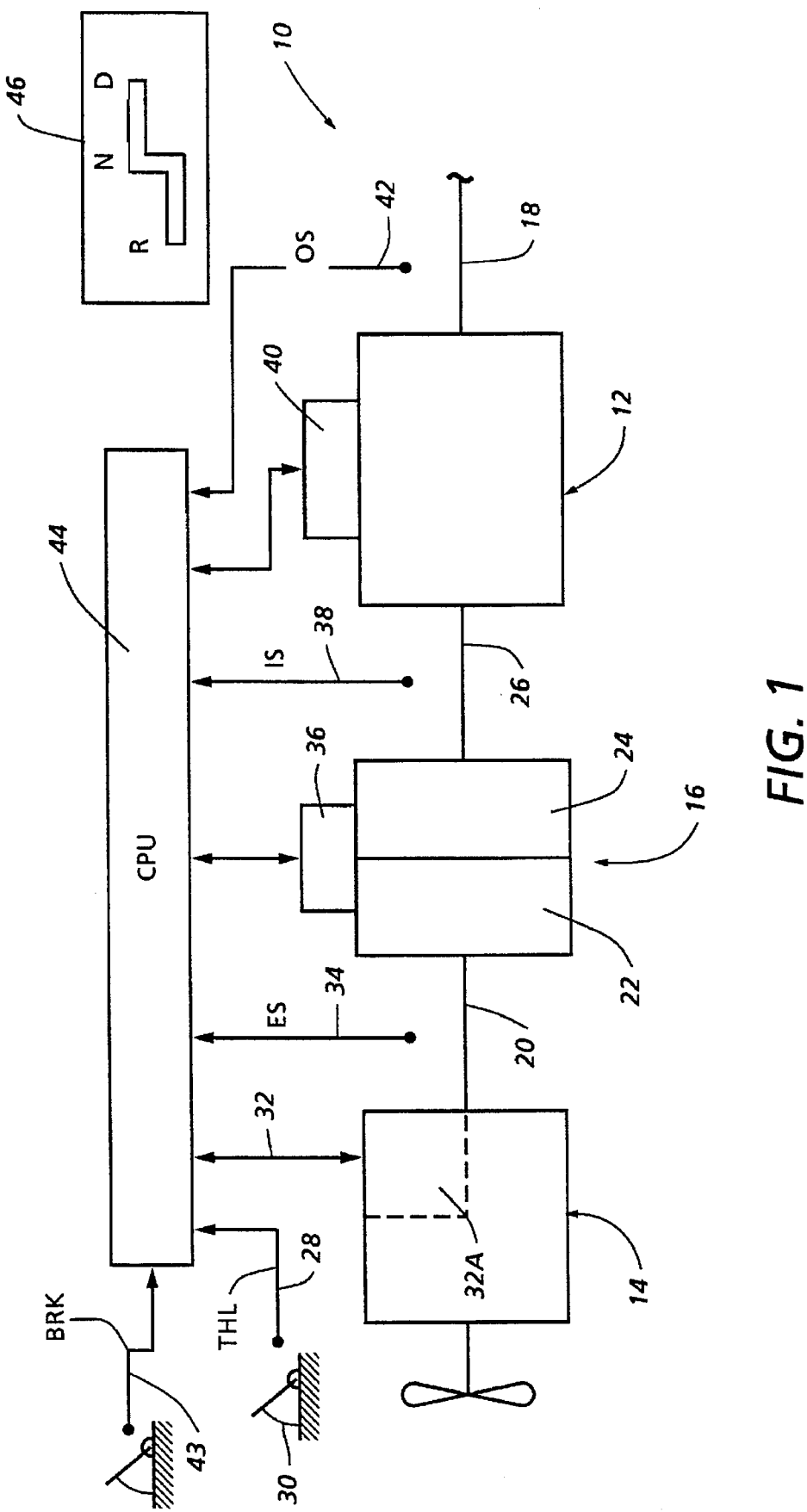
FIG. 1 is a schematic illustration of an automated mechanical transmission system of the type particularly well suited to be controlled by the method/apparatus of the present invention.

Certain terminology will be used in the following description for convenience and reference only and will not be limiting. The words "upwardly," "downwardly," "rightwardly" and "leftwardly" will designate directions in the drawings to which reference is made. The words "inwardly" and "outwardly" refer to directions towards and away from, respectively, the geometric center of the device and designated parts thereof. The above applies to the words above specifically mentioned, derivatives thereof and words of similar import.

The term "downshift" as used herein shall mean shifting from a higher-speed gear ratio into a lower-speed gear ratio and shall include single as well as skip downshifts.

FIG. 1 schematically illustrates a vehicular automated mechanical transmission system 10 including an automated multi-speed change gear transmission 12 driven by a fuel controlled engine 14, such as a well-known diesel engine, through a coupling such as master friction clutch 16. The output of automated transmission 12 is output shaft 18 which is adapted for driving connection to an appropriate vehicle component such as the differential of a drive axle, a transfer case, or the like, as is well known in the prior art.

The crank shaft 20 of engine 14 will drive the driving plates 22 of master friction clutch 16 which are frictionally engageable to driven plates 24 for driving the input shaft 26 of transmission 12.

The above-mentioned power train components are acted upon and/or monitored by several devices, each of which will be discussed briefly below. These devices will include a throttle pedal position or throttle opening monitor assembly 28 which senses the operator set position of the operator controlled throttle device 30, a fuel control device 32 for controlling the amount of fuel to be supplied to engine 14, and engine speed sensor 34 which senses the rotational speed of the engine, a clutch operator 36 which engages and disengages master clutch 16 and which may also provide information as to the status of the clutch, an input shaft speed sensor 38 for sensing the rotational speed of transmission input shaft 26, a transmission operator 40 which is effective to shift the transmission 12 into a selected gear ratio and to provide a signal indicative of the gear neutral condition and/or the currently engaged gear ratio, and an output shaft speed sensor 42 for sensing the rotational speed of the output shaft 18.

The engine fuel control device 32 may include an electronic computer-based engine controller 32A and/or an electronic data link of the type conforming to the SAE J1922, SAE J1939 and/or ISO 11898 protocols.

A sensor 43 is also provided for sensing operation of the vehicle brake system.

The above-mentioned devices supply information to and/or accept commands from the central processing unit or control 44. The central processing unit 44 may include analog and/or digital electronic calculation and logic circuitry as is known in the prior art. The central processing unit 44 will also receive information from a shift control assembly 46 by which the vehicle operator may select a reverse (R) neutral (N) or forward drive (D) mode of operation of the vehicle. An electrical power source (not shown) and/or a source of pressurized fluid (not shown) provides electrical and/or pneumatic and/or hydraulic power to the various sensing, operating and/or processing units.

Drive train components and controls therefor of the type described above are known in the prior art and may be appreciated in greater detail by reference to U.S. Pat. Nos. 4,899,607; 4,873,881; 4,936,156; 4,959,986; 4,576,065; 4,445,393, the disclosures of which are incorporated herein by reference. The sensors 28, 34, 36, 38, 42, 43 and 46 may be of any known type of construction for generating analog or digital signals proportional to the parameter monitored thereby. Similarly, operators 32, 36 and 40 may be of any known electric pneumatic or electro-pneumatic or electro-hydraulic type for executing operations in response to command output signals from the central processing unit 44.

In addition to direct inputs, the central processing unit 44 may be provided with circuitry for differentiating the input signal from at least sensors 34 and 38 to provide a calculated signal indicative of the acceleration and/or deceleration of the engine and the transmission input shaft 26. The CPU 44 may also be provided with circuitry and/or logic rules to compare the input signals of sensors 38 and 42 to verify and identify that the transmission 12 is engaged in a particular gear ratio, etc.

Although the present invention is illustrated as applied to a fully automated mechanical transmission system, it also is applicable to partially automated mechanical transmission systems, an example of which is illustrated in aforementioned U.S. Pat. No. 4,648,290.

In vehicular mechanical tranmission systems of the type illustrated, shifts usually are implemented using the double-clutching technique. For example, a downshift is accomplished by the "double-clutching" technique comprising disengaging the master clutch, shifting to neutral, engaging the master clutch, and accelerating the engine and transmission input shaft to synchronous for the current output shaft speed and target gear ratio ($ES=IS=OS * GR_T$), disengaging the master clutch, engaging the target gear ratio, and then reengaging the master clutch.

To improve shift quality, it is important to control the rate of clutch engagement (CLU_RATE) during the master clutch engagement terminating the shift operation. This clutch engagement is referred to herein as clutch "reengagement."

To adjust the target engine speed for changes in vehicle speed and to account for the engine lag time (process time, communication latency time and engine response time), a target engine speed was calculated as $(OS * GR_T) + (K_1 * dOS/dt)$ where $K_1$ was a predetermined lag constant. Further, a nominal clutch reengagement rate (CLU_RATE) was determined for nominal shifting conditions as a function of lag, throttle position, engine rotational acceleration/deceleration and input shaft rotation acceleration/deceleration. This may be expressed as $CLU\_RATE=K_1+(K_2 * THL)+(K_3 * dES/dt)-(K_4 * dIS/dt)$ where $K_2$, $K_3$ and $K_4$ are predetermined constants.

Figure 2:
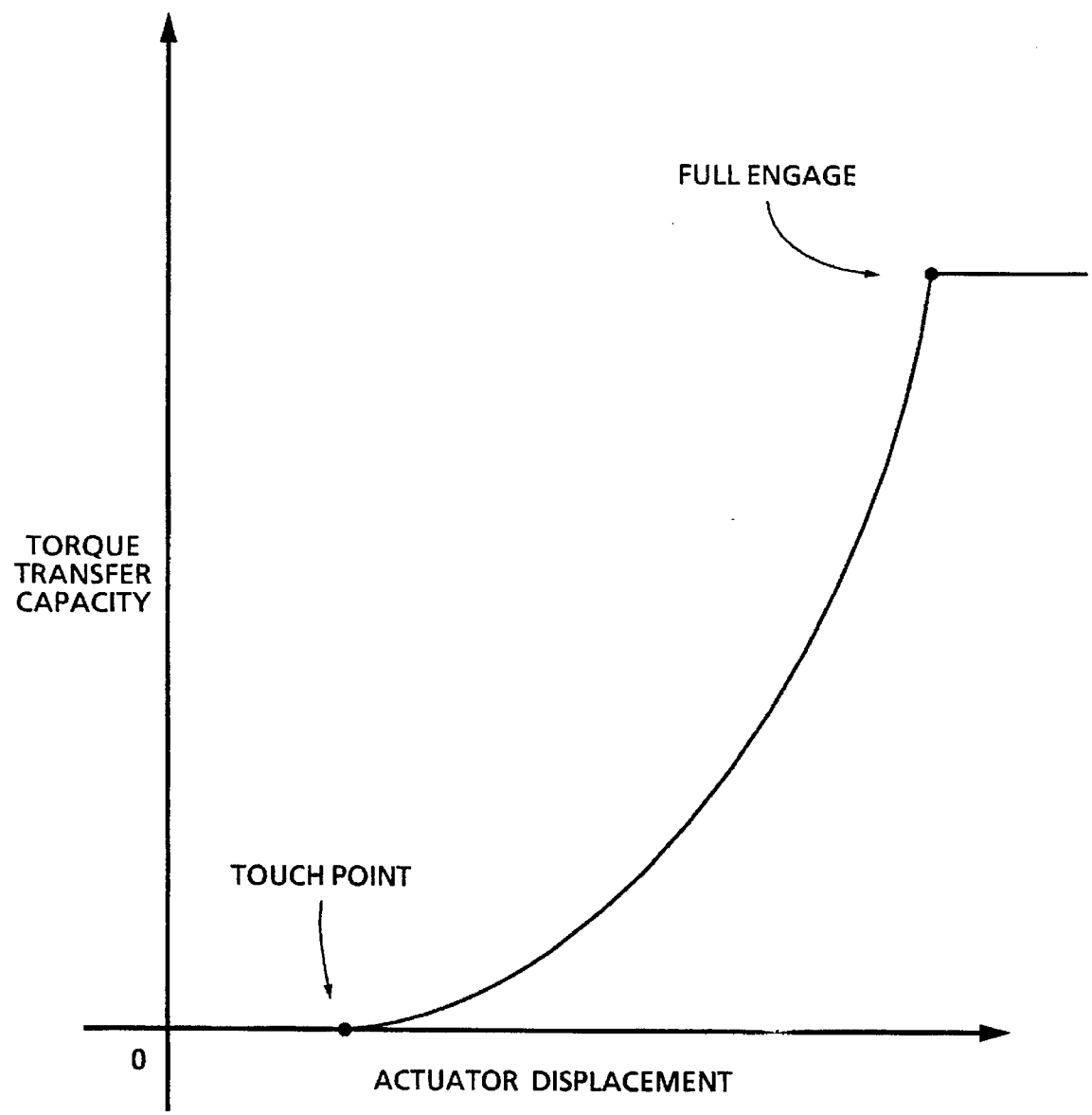
FIGS. 2 is a graphical representation of the relationship between torque transfer capacity and actuator displacement.

The nominal clutch reengagement rate, CLU_RATE, refers to the rate of increased torque transfer capacity after achieving incipient engagement or touch point. As may be seen by reference to FIG. 2, if there is a known, somewhat linear relationship between clutch torque transfer capacity and actuator displacement between the touch point and full engagement, then the actuator displacement and rate of change thereof may be used as a control parameter indicative of clutch torque capacity and rate of change thereof. Of course, other actuator parameters such as a pressure, voltage, deflection and the like may be substituted as a control parameter indicative of clutch torque transfer capacity.

The prior art clutch controls were not totally satisfactory, as downshifting during rapid deceleration (i.e., during braking) and/or coasting conditions (i.e., light throttle conditions) was not as consistently smooth as desired, due in large part to an excessive clutch reengagement rate in certain conditions.

During a braking operation, especially a heavy breaking operation, due to filtering of various signals such as the dOS/dt signal, the engine speed may be greater than desired. If rapid reengagement occurs, a rough shift may result and, thus, it is highly desirable to slow the clutch reengagement rate. Further, slowing of the reengagement rate may be desirable to prevent induced wheel slip on slick pavement due to engine retardation.

Further, during coasting conditions (i.e., throttle pedal only minimally displaced—for example, THL<30%), the operator has indicated that excessive power is not required and a smoother shift can occur by using a decreased engagement rate for the reengagement without objectionably affecting vehicle performance.

Figure 3A:
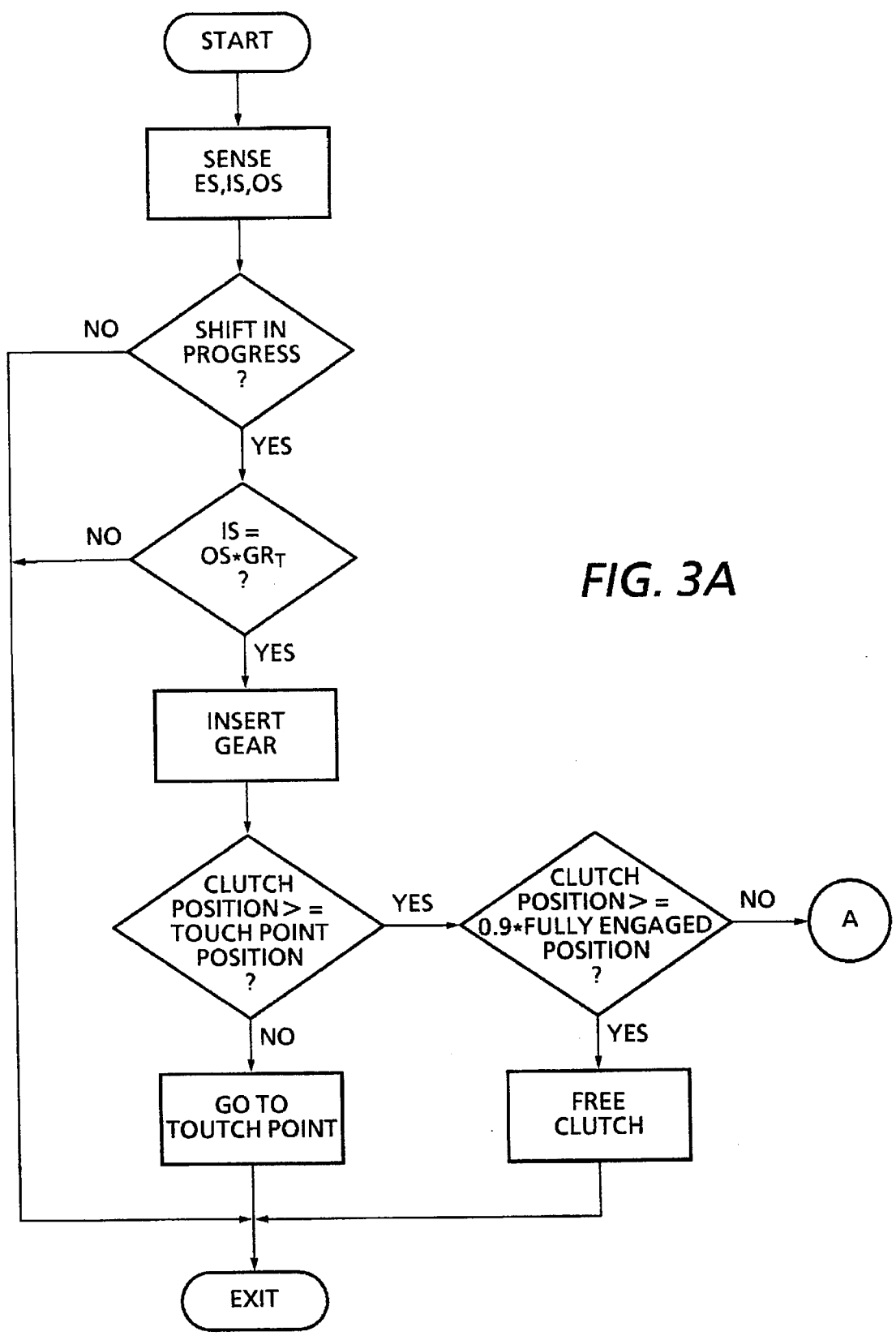
FIGS. 3A and 3B are graphical representations, in flow chart format, of the control method/apparatus of the present invention.
Figure 3B:
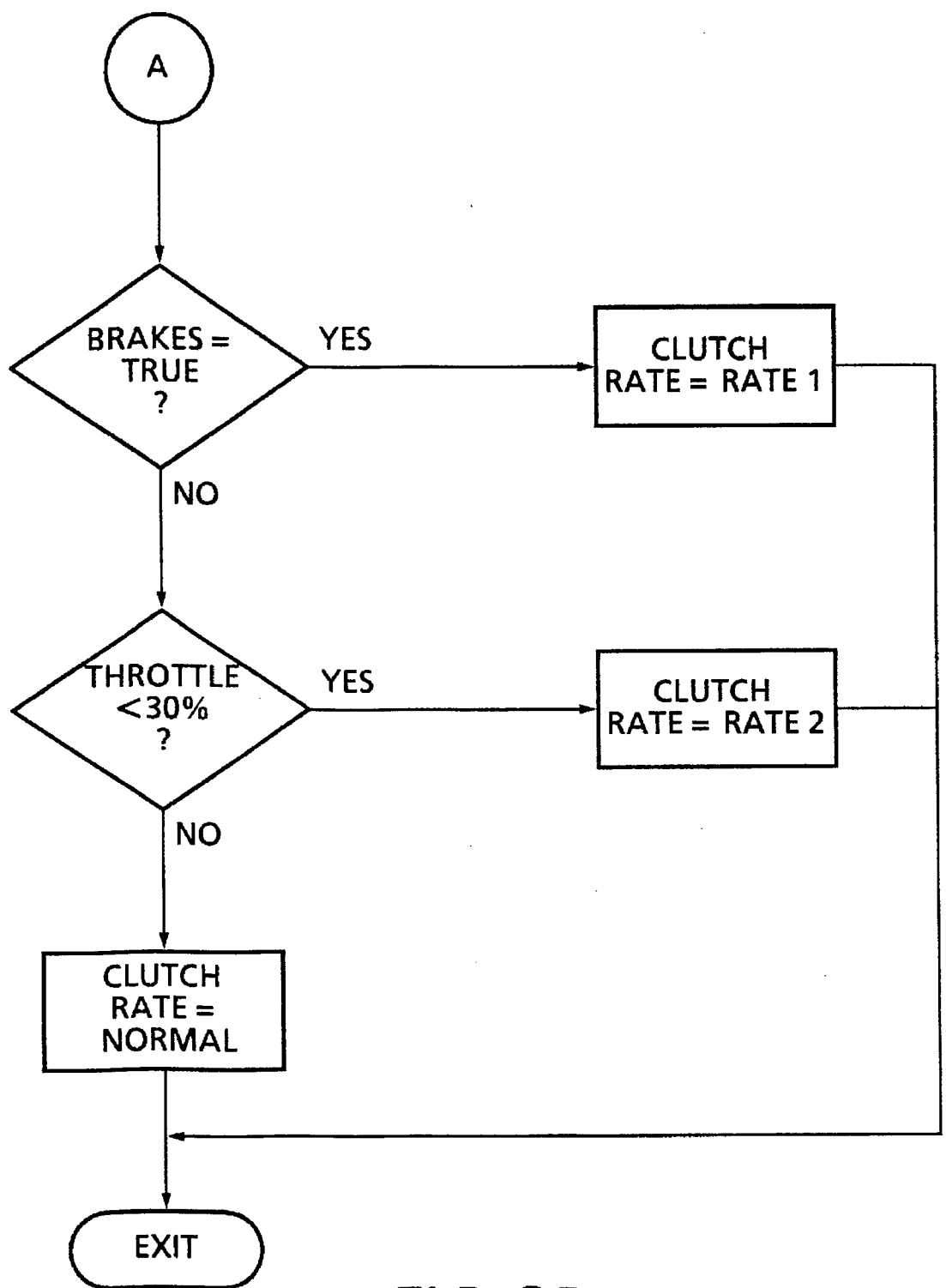

According to the present invention, as symbolically illustrated in FIGS. 3A and 3B, a nominal clutch reengagement rate, CLU_RATE, is determined as a function of engine lag factors ($K_1$), throttle position (THL), rate of change in engine rotational speed (dES/dt) and/or rate of change in input shaft rotational speed (dIS/dt).

The system monitors throttle pedal position (THL) and brake system (BRK=1 or BRK=0) operation. If the brakes are actuated (BRK=1) and the throttle pedal is not depressed (THL<$REF_1 \cong 0$), then the rate of reengagement, after rapid movement to touch point, will be about 20% to 25% of the nominal rate (CLU_RATE). If the throttle pedal is only lightly depressed (THL<$REF_2 \cong 30\%$), then the rate of reengagement, after rapid movement to touch point, will be about 25% to 50% of the nominal rate.

In many of the other situations, after rapid movement to touch point, the clutch will be commanded to reengage at the nominal rate. The foregoing clutch control strategy provides a more consistently smooth downshift under various operating conditions than existed in the prior art.

Although the present invention has been described with a certain degree of particularity, it is understood that various modifications are possible without departing from the spirit and the scope of the invention as hereinafter claimed.

I claim:

1. A master clutch reengagement control system for a vehicular automated mechanical transmission system (10) of the type comprising a multiple-speed change-gear mechanical transmission (12) drivingly connected to a fuel-controlled engine (14) by a friction master clutch (16), a throttle controller (30) operable by a vehicle operator to select fueling of the engine, a controller (44) for receiving input signals including an input signal (THL) indicative of setting of the throttle controller and for processing same in accordance with predetermined logic rules to issue command output signals to system operators including a transmission operator (48) for shifting the transmission and a clutch operator (36) for engaging and disengaging said master clutch, said automated transmission system performing downshifts into a downshift target gear ratio ($GR_T$) in a sequence including reengaging the master clutch after engagement of the transmission in the downshift target gear ratio, said control system comprising:

means for determining a nominal clutch reengagement rate (CLU_RATE) on the basis of input signals received by the controller;

means for comparing throttle setting to a coasting throttle reference value ($REF_2$); and means effective, if throttle setting is less than said coasting throttle reference value, for commanding reengaging of said master clutch after engagement of the transmission in the downshift target gear ratio in a sequence comprising movement of said clutch at a faster rate than said nominal rate to a point of incipient engagement thereof and then further engagement at a coasting reengagement rate (Y * CLU_RATE) slower than said nominal reengagement rate.

2. The control system of claim 1 wherein said input signals further include signals indicative of at least one of input shaft speed (IS), rate of change of input shaft speed (dIS/dO, engine speed (ES), and rate of change of engine speed (dES/dt), and said nominal clutch reengagement rate is a function of two or more of throttle position, rate of change of engine speed (dES/dt), rate of change of engine speed (dES/dt) and a factor ($K_1$) related to engine response lag.

3. The control system of claim 1, further comprising means effective, for at least one operating condition, for commanding reengagement of said master clutch after engagement of the downshift target gear ratio in a sequence comprising movement of said clutch at a faster rate than said nominal rate said point of incipient engagement thereof and further engagement at said nominal reengagement rate.

4. The control system of claim 2, further comprising means effective, for at least one operating condition, for commanding reengagement of said master clutch after engagement of the downshift target gear ratio in a sequence comprising movement of said clutch at a faster rate than said nominal rate to said point of incipient engagement thereof and then further engagement at said nominal reengagement rate.

5. The control system of claim 1 wherein said coasting reengagement rate is in the range of about 25% to 50% of said nominal reengagement rate.

6. The control system of claim 2 wherein said coasting reengagement rate is in the range of about 25% to 50% of said nominal reengagement rate.

7. The control system of claim 1 wherein said coasting throttle reference value ($REF_2$) corresponds to about 30% displacement of said throttle.

8. The control system of claim 2 wherein said coasting throttle reference value ($REF_2$) corresponds to about 30% displacement of said throttle.

9. The control system of claim 8 further comprising means effective, for at least one operating condition, for commanding reengagement of said master clutch after engagement of the downshift target ratio in a sequence comprising movement of said clutch at a faster rate than said nominal rate to said point of incipient engagement thereof and then further engagement at said nominal reengagement rate.

10. The control system of claim 8 wherein said braking reengagement rate is in the range of about 20% to 25% of said nominal reengagement rate.

11. The control system of claim 8 wherein said braking throttle reference value ($REF_1$) corresponds to about 0% displacement of said throttle.

12. The control system of claim 8 wherein said coasting reengagement rate is in the range of about 25% to 50% of said nominal reengagement rate.

13. A master clutch reengagement control system for a vehicular automated mechanical transmission system (1 0) of the type comprising a multiple-speed change-gear mechanical transmission (12) drivingly connected to a fuel-controlled engine (14) by a friction master clutch (16), a throttle controller (30) operable by a vehicle operator to select fueling of the engine, a controller (44) for receiving input signals including an input signal (THL) indicative of setting of the throttle controller and an input signal (BRK) indicative of operation of a vehicle brake system (43), and for processing same in accordance with predetermined logic rules to issue command output signals to system operators including a transmission operator (48) for shifting the transmission, and a clutch operator (36) for engaging and disengaging said master clutch, said automated transmission system performing downshifts into a target gear ratio ($GR_T$) in a sequence including reengaging the master clutch after engagement of the transmission in the downshift target gear ratio; said control system comprising:

means for determining if the vehicle brake system is being operated (BRK=1 or BRK=0);

means for determining a nominal clutch reengagement rate (CLU_RATE) on the basis of input signals received by the controller;

means for comparing throttle setting to a braking throttle reference value (REF$_1$); and means effective, if the brake system is being operated (BRK=1) and if throttle setting is less than said braking throttle reference value, for commanding reengaging of said master clutch after engagement of the transmission in the downshift target gear ratio in a sequence comprising movement of said clutch at a faster rate than said nominal rate of incipient engagement to a point thereof and then further engagement at a braking reengagement rate (X * CLU_RATE) slower than said nominal reengagement rate.

14. The control system of claim 13 wherein said input signals further include signals indicative of at least one of input shaft speed (IS), rate of change of input shaft speed (dIS/dt), engine speed (ES), and rate of change of engine speed (dES/dt), and said nominal clutch reengagement rate is a function of two or more of throttle position, rate of change of engine speed (dES/dt), rate of change of engine speed (dES/dt) and a factor (K$_1$) related to engine response lag.

15. The control system of claim 13, further comprising means effective, for at least one operating condition, for commanding reengagement of said master clutch after engagement of the downshift target ratio in a sequence comprising movement of said clutch at a faster rate than said nominal rate to said point of incipient engagement thereof and then further engagement at said nominal reengagement rate.

16. The control system of claim 13 wherein said braking reengagement rate is in the range of about 20% to 25% of said nominal reengagement rate.

17. The control system of claim 13 wherein said braking throttle reference value (REF$_1$) corresponds to about 0% displacement of said throttle.

18. The control system of claim 13, further comprising:
means for comparing throttle setting to a coasting throttle reference value (REF$_2$); and
means effective, if throttle setting is less than said coasting throttle reference value, for commanding reengaging of said master clutch after engagement in the transmission of the downshift target ratio in a sequence comprising rapid movement of said clutch at a faster rate than said nominal rate to a point of incipient engagement thereof and then further engagement at a coasting reengagement rate (Y * CLU_RATE) slower than said nominal reengagement rate.

19. The control system of claim 13 wherein said coasting reengagement rate is in the range of about 25% to 50% of said nominal reengagement rate.

20. The control system of claim 13 wherein said coasting throttle reference value (REF$_2$) corresponds to about 30% displacement of said throttle.

21. A control method for a vehicular automated mechanical transmission system (10) comprising a multiple-speed change-gear mechanical transmission (12) drivingly connected to a fuel-controlled engine (14) by a friction master clutch (16), a throttle controller (30) operable by a vehicle operator to select fueling of the engine, a controller (44) for receiving input signals including an input signal (THL) indicative of setting of the throttle controller and for processing same in accordance with predetermined logic rules to issue command output signals to system operators including a transmission operator (48) for shifting the transmission and a clutch operator (36) for engaging and disengaging said master clutch, said system performing downshifts into a downshift target gear ratio (GR$_T$) in a sequence including reengaging the master clutch after engagement of the transmission in the downshift target gear ratio, said method comprising:

determining a nominal clutch reengagement rate (CLU_RATE) on the basis of input signals received by the controller;

comparing throttle setting to a coasting throttle reference value (REF$_2$); and if throttle setting is less than said coasting throttle reference value, commanding reengaging of said master clutch after engagement of the transmission in the downshift target gear ratio in a sequence comprising movement of said clutch at a rate faster than said nominal rate to a point of incipient engagement thereof and then further engagement at a coasting reengagement rate (Y * CLU_RATE) slower than said nominal reengagement rate.

22. The method of claim 21 wherein said input signals further include signals indicative of at least one of input shaft speed (IS), rate of change of input shaft speed (dIS/dt), engine speed (ES), and rate of change of engine speed (dES/dr), and said nominal clutch reengagement rate is a function of two or more of throttle position, rate of change of engine speed (dES/dr), rate of change of engine speed (dES/dt) and a factor (K$_1$) related to engine response lag.

23. The method of claim 21 wherein, for at least one operating condition, said controller commands reengaging of said master clutch after engagement of the downshift target gear ratio in a sequence comprising movement of said clutch at a faster rate than said nominal rate to said point of incipient engagement thereof and then further engagement at said nominal reengagement rate.

24. The method of claim 22 wherein, for at least one operating condition, said controller commands reengaging of said master clutch after engagement of the downshift target gear ratio in a sequence comprising movement of said clutch at a faster rate than said nominal rate to said point of incipient engagement thereof and then further engagement at said nominal reengagement rate.

25. The method of claim 21 wherein said coasting reengagement rate is in the range of about 25% to 50% of said nominal reengagement rate.

26. The method of claim 22 wherein said coasting reengagement rate is in the range of about 25% to 50% of said nominal reengagement rate.

27. The method of claim 21 wherein said coasting throttle reference value (REF$_2$) corresponds to about 30% displacement of said throttle.

28. The method of claim 22 wherein said coasting throttle reference value (REF$_2$) corresponds to about 30% displacement of said throttle.

29. A control method for a vehicular automated mechanical transmission system (10) comprising a multiple-speed change-gear mechanical transmission (12) drivingly connected to a fuel-controlled engine (14) by a friction master clutch (16), a throttle controller (30) operable by a vehicle operator to select fueling of the engine, a controller (44) for receiving input signals including an input signal (THL) indicative of setting of the throttle controller and an input signal (BRK) indicative of operation of a vehicle brake system (43), and for processing same in accordance with predetermined logic rules to issue command output signals to system operators including a transmission operator (48) for shifting the transmission, and a clutch operator (36) for engaging and disengaging said master clutch, said system performing downshifts into a target gear ratio (GR$_T$) in a sequence including reengaging the master clutch after engagement of the transmission in the downshift target gear ratio, said method comprising:

determining if the vehicle brake system is being operated (BRK=1 or BRK=0);

determining a nominal clutch reengagement rate (CLU_RATE) on the basis of input signals received by the controller;

comparing throttle setting to a braking throttle reference value ($REF_1$); and if the brake system is being operated (BRK=1) and if throttle setting is less than said braking throttle reference value, commanding reengaging of said master clutch after engagement of the transmission in the downshift target gear ratio in a sequence comprising rapid movement of said clutch at a faster rate than said nominal rate to a point incipient engagement thereof and then further engagement at a braking reengagement rate (X * CLU_RATE) slower than said nominal reengagement rate.

30. The method of claim 29 wherein said input signals further include signals indicative of at least one of input shaft speed (IS), rate of change of input shaft speed (dIS/dt), engine speed (ES), and rate of change of engine speed (dES/dt), and said nominal clutch reengagement rate is a function of at least two of throttle position, rate of change of engine speed (dES/dt), rate of change of engine speed (dES/dt) and a factor ($K_1$) related to engine response lag.

31. The method of claim 29 wherein, for at least one operating condition, said controller commands reengaging of said master clutch after engagement of the downshift target ratio in a sequence comprising movement of said clutch at a faster rate than said nominal rate to touch point of incipient engagement thereof and then further engagement at said nominal reengagement rate.

32. The method of claim 30 wherein, for at least one operating condition, said controller commands reengaging of said master clutch after engagement of the downshift target ratio in a sequence comprising movement of said clutch at a faster rate than said nominal rate to said point of incipient engagement thereof and then further engagement at said nominal reengagement rate.

33. The method of claim 29 wherein said braking reengagement rate is in the range of about 20% to 25% of said nominal reengagement rate.

34. The method of claim 30 wherein said braking reengagement rate is in the range of about 20% to 25% of said nominal reengagement rate.

35. The method of claim 29 wherein said braking throttle reference value ($REF_1$) corresponds to about 0% displacement of said throttle.

36. The method of claim 30 wherein said braking throttle reference value ($REF_1$) corresponds to about 0% displacement of said throttle.

37. The method of claim 29 further comprising:

comparing throttle setting to a coasting throttle reference value ($REF_2$); and if throttle setting is less than said coasting throttle reference value, commanding reengaging of said master clutch after engagement of the transmission in the downshift target ratio in a sequence comprising movement of said clutch at a faster rate than said nominal rate to a point of incipient engagement and then further engagement at a coasting reengagement rate (Y * CLU_RATE) slower than said nominal reengagement rate.

38. The method of claim 30, further comprising:

comparing throttle setting to a coasting throttle reference value ($REF_2$); and if throttle setting is less than said coasting throttle reference value, commanding reengaging of said master clutch after engagement of the transmission in the downshift target ratio in a sequence comprising rapid movement of said clutch at a faster rate than said nominal rate to a point of incipient engagement thereof and then further engagement at a coasting reengagement rate (Y * CLU_RATE) slower than said nominal reengagement rate.

39. The method of claim 29 wherein said coasting reengagement rate is in the range of about 25% to 50% of said nominal reengagement rate.

40. The method of claim 30 wherein said coasting reengagement rate is in the range of about 25% to 50% of said nominal reengagement rate.

41. The method of claim 30 wherein said coasting throttle reference value ($REF_2$) is about 30% displacement of said throttle.

42. The method of claim 31 wherein said coasting throttle reference value ($REF_2$) corresponds to about 30% displacement of said throttle.

\* \* \* \* \*